United States Patent Office 3,428,914
Patented Feb. 18, 1969

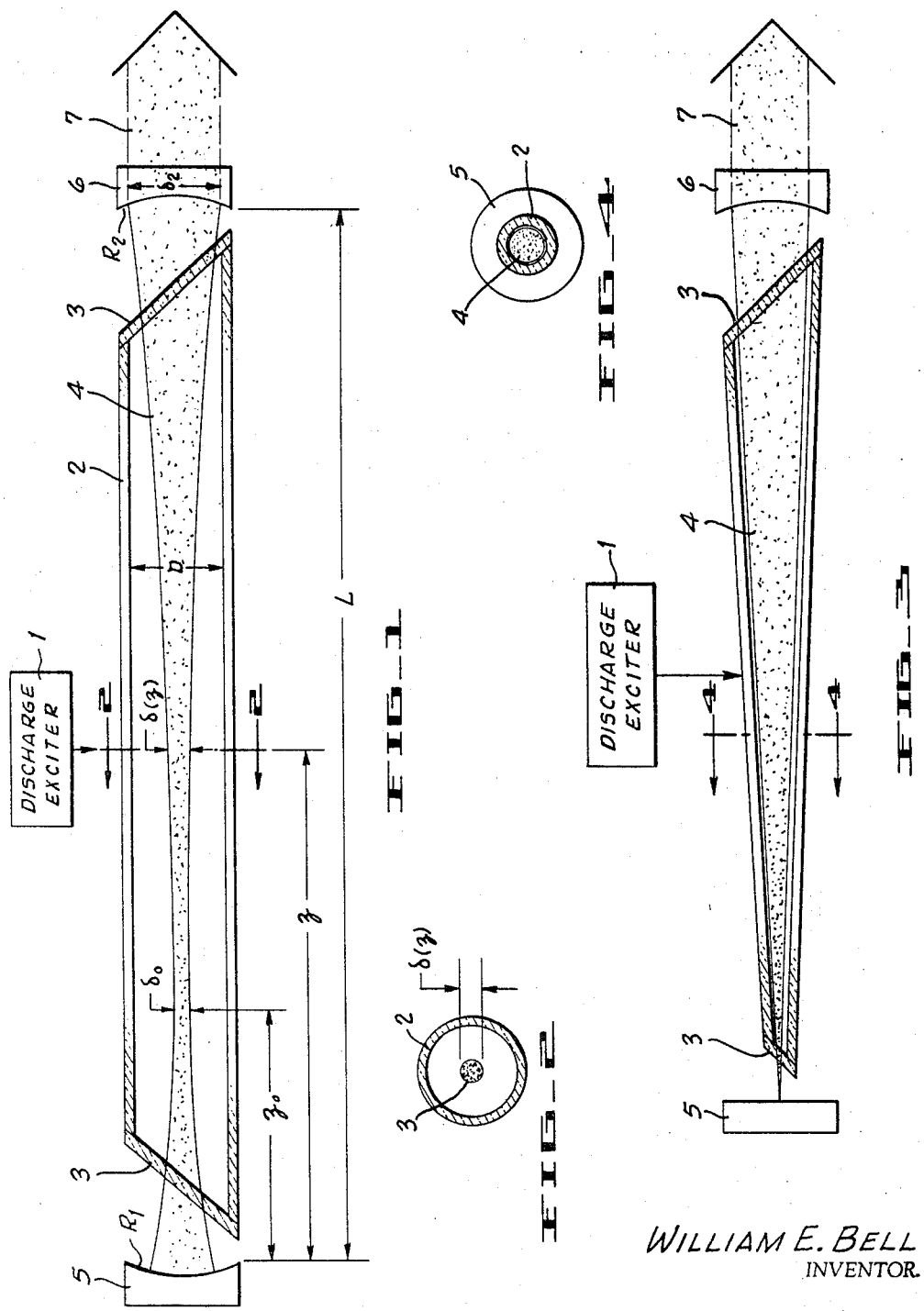

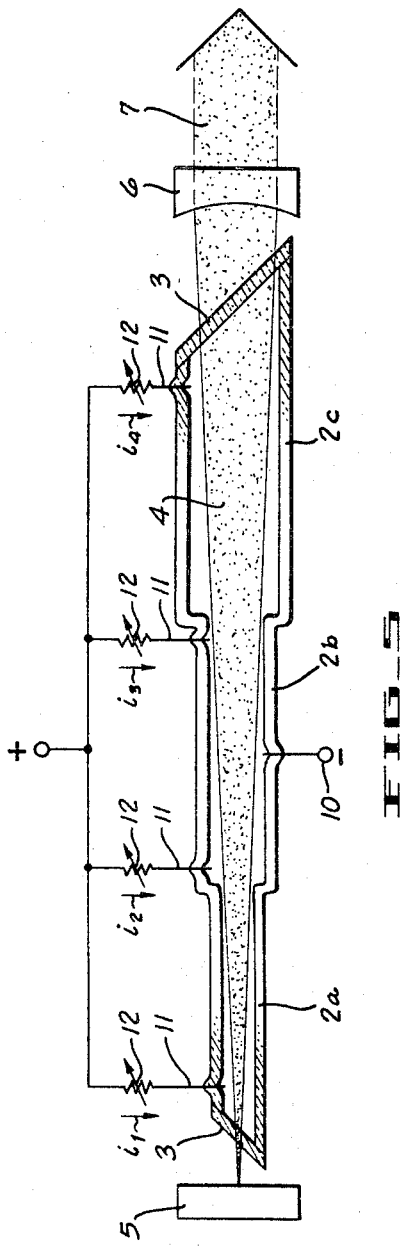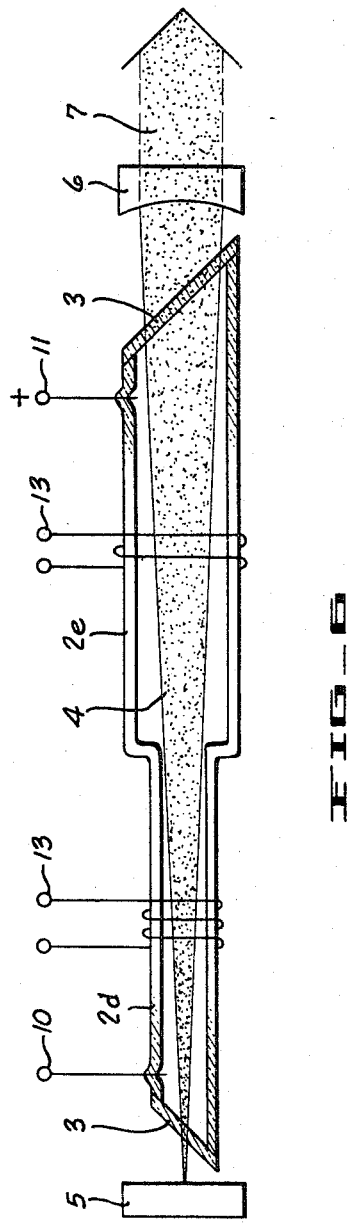

3,428,914
GAS LASERS WITH PLASMA TUBE HAVING VARIABLE CROSS-SECTION AND DISCHARGE CURRENT
William E. Bell, Palo Alto, Calif., assignor to Spectra-Physics, Inc., Mountain View, Calif., a corporation of California
Filed Jan. 25, 1965, Ser. No. 427,821
U.S. Cl. 331—94.5        4 Claims
Int. Cl. H01s 3/22; H01j 61/30; H01k 1/28

ABSTRACT OF THE DISCLOSURE

A gas laser in which a curved-reflector resonator establishes intra-resonator radiation in a pattern having a cross-section which varies substantially along the length of the resonator. The plasma tube containing the active gaseous laser medium has a cross-section which varies along the length of the tube in substantial conformance with variations in the cross-section of the intra-resonator radiation pattern, and a discharge current in the plasma tube is established with different values in portions of the tube having different cross-sections.

---

The present invention relates in general to gas lasers, and more particularly to plasma tubes used to contain the active medium of such lasers.

In order for a laser to operate effectively, the gain of the amplifying medium must be sufficient to overcome the various optical losses resulting from diffraction, scattering and absorption in the optical resonator. Lasers which use a gaseous amplifying medium are typically characterized by a net gain, and consequently an operating effectiveness and reliability, which is an undesirably sensitive function of the optical properties of the windows and reflectors and of the effects of competing radiation wavelengths.

I have discovered that prior plasma tubes, having a cross-section which is uniform throughout the length of the tube, result in a gain which is in general less than optimum for the mode pattern of the optical resonator, and that the performance of such lasers can frequently be improved significantly and made more reliable by using a plasma tube whose cross-section varies throughout the length thereof to conform to the radiation pattern of the optical resonator together with means for establishing a discharge current in said plasma tube which is different in portions of the tube having different cross-sections.

The various features and advantages of the present invention will become apparent upon a consideration of the following specification, taken in connection with the accompanying drawing wherein:

FIGURE 1 is a partially schematic diagram of a gas laser showing, in cross-section, a generalized curved-reflector intra-resonator radiation pattern and a uniform plasma tube configuration in accordance with the prior art;

FIGURE 2 is a cross-sectional view taken along line 2—2 in FIGURE 1;

FIGURE 3 is a partially schematic diagram of a gas laser showing, in cross-section, an intra-resonator radiation pattern and a plasma tube configuration in accordance with the present invention;

FIGURE 4 is a cross-sectional view taken along line 4—4 in FIGURE 3;

FIGURE 5 is a partially schematic diagram of a gas laser showing, in cross-section, an intra-resonator radiation pattern and another form of plasma tube configuration in accordance with the present invention; and FIGURE 6 is a partially schematic diagram of a gas laser showing, in cross-section, an intra-resonator radiation pattern and another form of plasma tube configuration in accordance with the present invention.

FIGURE 1 shows a typical gas laser in which an optically-radiating discharge is established by power source 1 in the active gaseous medium contained in plasma tube 2. Optical radiation at the desired wavelength is transmitted through vacuum-tight windows 3, inclined at Brewster's angle for maximum transmission, and reflected back and forth through the amplifying active medium in a beam pattern 4 (shown in speckled cross-section) by an optical resonator comprising two optically-facing reflectors 5 and 6. Sufficient transmission at the operating wavelength is provided in at least one of the reflectors to form the output laser beam 7.

In order to minimize the sensitivity of the optical resonator to misalignment in the parallelism of the reflectors and to provide better control over the resonator modes, it is the usual practice to use at least one curved reflector. However, the use of such a reflector results in a focussing or constriction of the intra-resonator radiation beam 4.

For the lowest order spatial mode of the optical resonator, the intensity of the beam across a transverse section such as shown in FIGURE 2 falls off radially according to the relationship $$I = I_0 e^{-8r^2/\delta^2}$$

where $r$ is the radial distance from the tube axis, and $\delta$, which is twice the radial distance at which the intensity has dropped to $1/e^2$ of its central intensity $I_0$, is taken to be the beam diameter. For a resonator operating at wavelength $\lambda$ with spherical reflector 5 of radius (of curvature) $R_1$ and spherical reflector 6 of radius $$R_2 (R_2 \leq R_1)$$

the variation of the beam diameter $\delta$ with the distance $z$ from reflector 5 is given by:

$$\sigma(z) = \delta_0 \sqrt{1 + \frac{4\lambda(z_0 - z)^2}{\pi \delta_0^2}}$$

where $$\delta_0 = \frac{\delta_2}{\sqrt{1 + \left(\frac{\pi \delta_2^2}{4\lambda R_1}\right)^2}}$$

is the minimum beam diameter which occurs at $z = z_0$, $$z_0 = \frac{R_1}{1 + \left(\frac{4\lambda R_1}{\pi \delta_2^2}\right)^2}$$

and $$\delta_2 = \sqrt{\frac{4\lambda}{\pi}} \left[\frac{R_2}{R_1} \cdot \frac{R_1 - L}{R_2 - L} \cdot \frac{R_1 R_2 L}{R_1 + R_2 - L}\right]^{1/4}$$

is the maximum beam diameter (at $z = L$).

In order to operate in the lowest order spatial mode, the diameter D of the plasma tube 2 is chosen to be somewhat larger than $\delta_2$ so as to expose a large percentage of the beam power to the amplifying medium, but not so large as to permit oscillation of higher order modes (which have a larger beam size). It is not usually necessary to make D greater than $2\delta$, since at this point 99.97% of the beam power is contained in the plasma tube.

Operation in the lowest order spatial mode is usually the most desirable, since this produces a single-phase diffraction-limited output wavefront. Operation in a higher order mode may be used for somewhat greater power with phase reversals in the output wavefront. For operation in a higher order mode, the plasma tube diameter D is made larger relative to $\delta_2$ for the lowest order mode. In general, the plasma tube will be somewhat larger than the maximum beam diameter for the operating mode, and the beam diameter will vary along the tube in accordance with the equations given above.

I have discovered that the gain of the amplifying medium can be increased if the plasma tube is shaped to conform with the shape of the intra-cavity beam 4. Ideally this would be done by selecting the ratio $D/\delta_2$ at reflector $R_2$ in accordance with the above considerations (usually $1 \leq D/\delta_2 \leq 2$) and then varying D throughout the length of the plasma tube so that the ratio $D/\delta$ remains constant. In practice, substantial improvement in gain may be realized by simpler configurations which approximate the ideal case. The increased gain results from reducing the excess of plasma tube diameter over that required by the operating conditions of the optical resonator. This is apparently due to the following two effects:

(1) The average tube diameter is decreased so that the average time required for an excited gas particle (atom or molecule) to be de-excited by wall collisions is reduced. Thus, there is less tendency toward the undesired building up of population in long-lived excited states.

(2) There are less non-amplifying particles situated outside of the intra-resonator beam at the desired wavelength. Such particles can give rise to competing radiation at an undesired wavelength which causes a decrease in the laser population inversion.

Three particular embodiments of the present invention are shown in FIGURES 3, 5, and 6. In these embodiments, reflector 5 is a plane reflector ($R_1 = \infty$) and the reflector separation L is slightly less than the radius $R_2$ of reflector 6. Under these conditions, the lowest order mode can operate at reasonably high powers and yet be relatively insensitive to the alignment of the reflectors. In this case, the maximum size of the beam at spherical reflector 6 is $$\delta_2 = \sqrt{\frac{4\lambda}{\pi}} \left[ \frac{R_2^2 L}{R_2 - L} \right]^{1/4}$$

and the beam reduces, in an essentially uniform manner, to a very small spot at the plane reflector 5. The ideal plasma tube configuration for this case, shown in FIGURE 3, is a substantially uniformly tapered tube 2 of diameter somewhat more than one times the diameter of the beam.

For ease of construction, the tapered tube of FIGURE 3 can be approximated by a stepped series of uniform diameter tube segments. FIGURE 5 shows such a tube having three segments; and FIGURE 6 shows such a tube having two segments.

To give specific examples, consider an optical resonator in which $R_2 = 120$ cm., $L = 119.6$ cm., and $\delta_2 = 4$ mm. The tapered plasma tube of FIGURE 3 would then preferrably taper from an inner diameter of 8 mm. to a minimum practical inner diameter, for example 1 mm. Stepped tube approximations as shown in FIGURE 5 and 6 have been built for this case and found significantly effective in raising the gain of amplifying medium (and hence the output power) over a uniform tube. For FIGURE 5, an example tested had section $2a$ of 2.5 mm. inner diameter and 36 mm. length, section $2b$ of 5 mm. inner diameter and 39 cm. length, and section $2c$ of 8 mm. inner diameter and 39 cm. length. For FIGURE 6, an example tested had section $2d$ of 5 mm. inner diameter and 54.5 cm. length, and section $2e$ of 8 mm. inner diameter and 60.5 cm. length.

As a further aspect of my discovery, I have determined that, in general, the optimum electrical discharge conditions will be different in parts of the plasma tube having different cross-sections. For the helium-neon laser at 6328 A., for example, a smaller diameter tube section is found to operate best at a somewhat smaller absolute current (although larger current density) than a larger diameter tube section. Thus, it is desirable to use a discharge exciter 1 which permits independent control of the discharge current in different portions of the plasma tube. Such an exciter is shown in FIGURE 5 having a central cathode 10 and a spaced array of anodes 11. Separate independent anode currents $i_1$, $i_2$, $i_3$, and $i_4$ are established by adjustment of current-limiting resistors 12 placed in series with the anodes 11. The current in plasma tube section $2a$ is then $i_1$; the current in section $2c$ is $i_4$; and the current in section $2b$ is $i_1 + i_2 = i_3 + i_4$. Electrodeless radio frequency excitation may be used either as an alternative or in addition to the illustrated internal electrode excitation. For example, as shown in FIGURE 6, a single bias current may be established throughout the tube with a single pair of internal electrodes 10, 11, and then radio frequency couplers 13 (for example H-field coils or E-field capacitively-coupled bands) placed along the plasma tube to produce the desired gradation of discharge current by means of varying amounts of power coupling to separate portions of the discharge. In a still further example, the electrodes 10, 11 may be omitted and the entire gradated discharge current produced by coils 13.

I claim:

1. In a gas laser, the combination comprising: means for establishing radiation in a pattern having a cross-section which varies substantially along the length of said pattern; a plasma tube surrounding said pattern and containing a gaseous medium for amplifying said radiation, said tube having a cross-section which varies along the length of said tube in substantial conformance with the variations in the cross-section of said radiation pattern; and means for establishing an electrical discharge in said amplifying gaseous medium, said discharge having a current which is different in portions of said tube having different cross-sections.

2. The combination of claim 1 wherein said discharge means includes a single electrode of one polarity disposed centrally in said tube and an array of electrodes of opposite polarity spaced along the length of said tube, and means for establishing an independently variable current in each of said last-named electrodes.

3. The combination of claim 1 including radio frequency coupling means spaced along said tube for coupling radio frequency power to said discharge, the power coupling of said means to said discharge being different in portions of said tube have different cross-sections.

4. The combination of claim 1 wherein said discharge means establishes a discharge current in one portion of said plasma tube which is smaller than the discharge current in a second portion of said plasma tube, said first tube portion having a cross-section which is smaller than the cross-section of said second tube portion.

References Cited

UNITED STATES PATENTS

| | | | |
|---|---|---|---|
| 1,792,347 | 2/1931 | Zecher | 313—220 |
| 2,657,315 | 10/1953 | Goldstein | 313—93 |
| 3,137,827 | 6/1964 | Pierce | 331—94.5 |
| 3,369,192 | 2/1968 | Koester | 331—94.5 |

JEWELL H. PEDERSEN, *Primary Examiner.*

R. L. WIBERT, *Assistant Examiner.*

U.S. Cl. X.R.

313—220; 330—4.3